Oct. 21, 1952  H. P. RITSCH  2,614,748
CENTRIFUGE FOR SEPARATING SOLIDS
Filed July 29, 1947  4 Sheets-Sheet 1

INVENTOR.
HOWARD P. RITSCH
BY
ATTORNEYS

Oct. 21, 1952     H. P. RITSCH     2,614,748
CENTRIFUGE FOR SEPARATING SOLIDS

Filed July 29, 1947     4 Sheets-Sheet 3

INVENTOR.
HOWARD P. RITSCH
BY
Busser + Harding
ATTORNEYS

INVENTOR.
HOWARD P. RITSCH
BY
ATTORNEYS

Patented Oct. 21, 1952

2,614,748

UNITED STATES PATENT OFFICE 2,614,748

CENTRIFUGE FOR SEPARATING SOLIDS

Howard P. Ritsch, Chicago, Ill.

Application July 29, 1947, Serial No. 764,368

7 Claims. (Cl. 233—7)

This invention relates to an improvement in the art of separating solids of different densities by means of a liquid medium of intermediate density, and media whereby the solids are separated, as set forth in my Patent No. 2,528,974, issued November 7, 1950.

In the "sink-float" method of separation as now practiced, there are two definite limitations.

First, it has not proved feasible to apply such methods on a large or commercial scale to particles smaller than $\frac{1}{32}$ of an inch.

Second, the maximum density which can be used as the point of separation by such methods is about 3.3, as water is the only medium in which solids are suspended and galena and ferrosilicon are the only solids being used at present on a large scale, except in the cleaning of coal. Another limiting factor is viscosity, which builds up rapidly after a certain concentration of solids in the fluid is reached. These limitations exclude separations not only of the precious metals but also of the greater number of base metal minerals.

One of the objects of this invention is the provision of a method and apparatus, whereby separations of particles down to 100 mesh or finer may be made.

Another object of this invention is the provision of a method and apparatus whereby minerals ranging in density down to those of the platinum group may be separated.

Another object of this invention is the provision of a method and means whereby the amount of medium required to carry out the separation of minerals has been greatly reduced so that it is possible to use certain desirable media which have heretofore been excluded by the cost of maintaining the large stock required, for a given hourly capacity.

Another object of this invention is the provision of a method and apparatus whereby the medium loss is reduced to a minimum.

Another object of this invention is to extend the range for separation of solid particles by virtue of specific gravities relative to that of the liquid suspension medium, by the provision of a medium which can be adjusted precisely to a tenth of a point throughout the entire range of densities of minerals, from the lightest to the heaviest, with the exception of the native precious metals, which are separated from other minerals but not from each other.

Another object of this invention is the provision of means by which, under centrifugal force, the rate of separation of minerals is greatly accelerated, thus reducing the size of the plant required as well as the amount of separation medium for a given capacity.

Another object of this invention is the provision of an apparatus which may be used for the separation of solids with "heavy media" currently in use on a commercial scale, as well as with some now commonly used only in laboratory tests because of the high cost of the constituents.

Another object of this invention is the provision of an apparatus whereby the lighter solids separated by the liquid medium are continuously discharged therefrom as well as the heavier solids within the medium.

Another object of this invention is the provision of means whereby the separation takes place in a zone where the surface density of the medium is at its maximum.

A further object of this invention is the provision of means for discharging both light and heavy solids from one end of the apparatus, while discharging the water and medium from the other end of the apparatus and the introduction of the solids and water at a point remote from the outlet for the water and the end of the rotor or screw at the outlet end for the water. The rotor being arranged to move the solids from said water outlet end or counter to the water flow so that any solids carried by the water are settled out and conveyed counter to the water flow by the screw before the solids are carried to the water outlet port. Thus the overflow water is relatively clear so the degree of turbidity and analysis of suspended solids provide an ideal check on the efficiency of separator at any given rate of feed of water or solids or rate of rotation of the rotor or of the screw relative to the rotor. This counterflow of the water and medium relative to the separated solids permits the discharge of the solids with a minimum of water or medium content.

Another object of my invention is the provision of means whereby the apparatus is adapted for either wet feeding or for feeding dry solids to the separator in cases where operation without water is feasible and necessary by merely withdrawing the feed tube for the dry solids and replacing with a tube for feeding solids with water.

Further objects of the invention and the manner in which they are obtained will appear from the following description of a preferred method and from one form of apparatus shown in the accompanying drawings in which.

Figure 1:
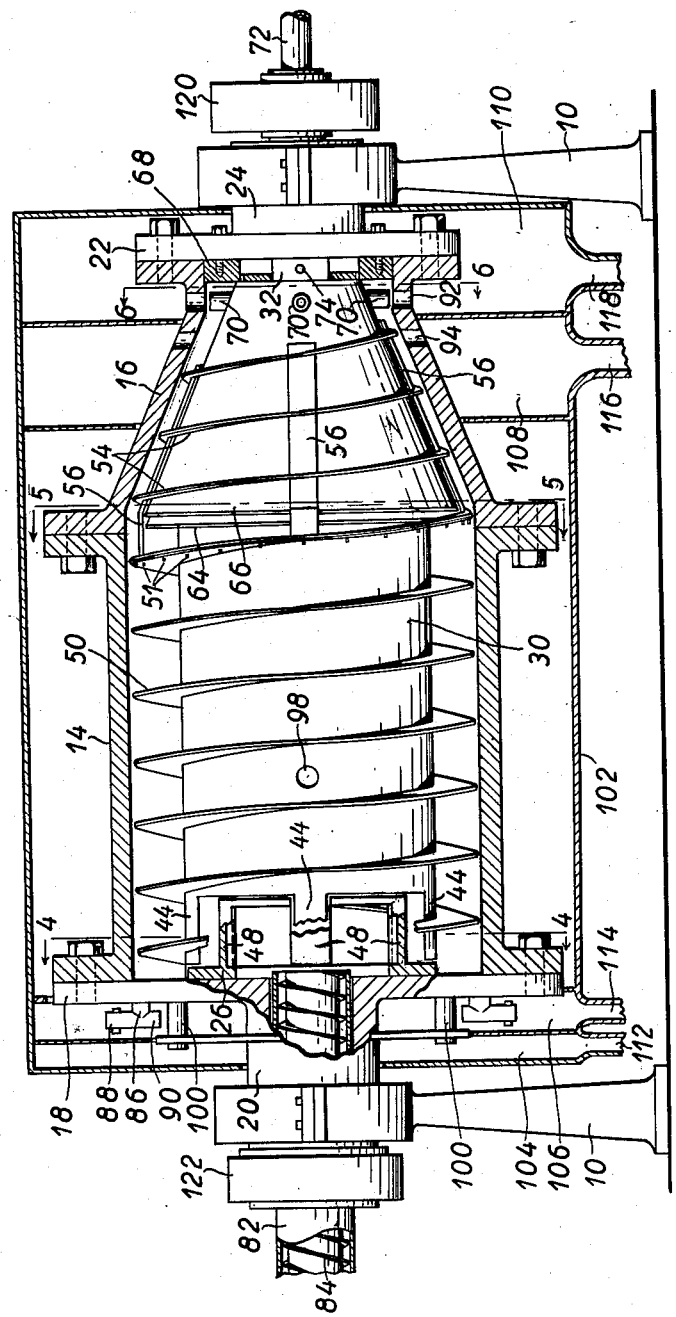
Fig. 1 is a vertical section through portions of the apparatus for separating solids.

The apparatus illustrated in the drawings comprises a standard 10 at each end thereof, each having a bearing at its upper end for supporting a cylindrical main shell 14 and a conical shell 16 connected thereto. Connected to the main shell is an end plate 18 having a hollow trunnion 20 forming a closure for the one end thereof rotatably mounted in the bearing at one end of the structure and 22 is an end plate secured to small end of the conical shell 16 which is also provided with a hollow trunnion 24 supported in the bearing at the other end of the structure.

Secured to the end plate 18 is a cup-shaped member 26 having a hollow stub shaft 28 extending inwardly therefrom. Mounted for rotation within the shells 14 and 16 is a drum 30 having a tapered end within the conical shell 16 provided with a closed end 36 and projecting outwardly therefrom is a hollow trunnion 32 extending through and slightly beyond the hollow trunnion 24 on the end plate 22, and located between the trunnions 32 and 24 is a bearing 33 in which the trunnion 32 is rotatably mounted.

The other end of the drum 30 is closed by a wall 38 and extending inwardly therefrom is a hollow boss 34 rotatably mounted on a bearing 35 supported on the hollow trunnion 28. A partition 40 within the drum, together with the end 36, entirely encloses a space within the drum 30 between the partition 40 and the end 36, and, formed between the partition 40 and the end wall 38 is a chamber 42 for the reception of wet solids to be separated. Extending from the end wall 38 of the drum are a plurality of ribs 44 which extend over a portion of the cup-shaped member 26 towards the supporting flange of the cup-shaped member but leaving a slight clearance space between the ends of the ribs 44 and the flange of the cup-shaped member 26.

Suitable packing members are located between the stub shaft 28 and the bore of boss 34 as well as between the end wall 38 of the drum 30 and the wall of the cup-shaped member 26 for preventing the entrance of liquid or solids to the bearing between the stub shaft 28 and the bore of boss 34.

The major portion of the annular wall of the cup-shaped member 26 between the end wall and the flange secured to end plate 18 is cut away leaving a plurality of ribs 48 between which are formed feed openings for delivering dry solids from the cup-shaped member 26 to the apparatus.

Mounted on the drum 30 is a worm having three portions carried thereby and arranged to be rotated with the drum to move the solids from the point of delivery to the apparatus towards the conical end thereof to outlet ports at the conical end of the apparatus.

Figure 5:
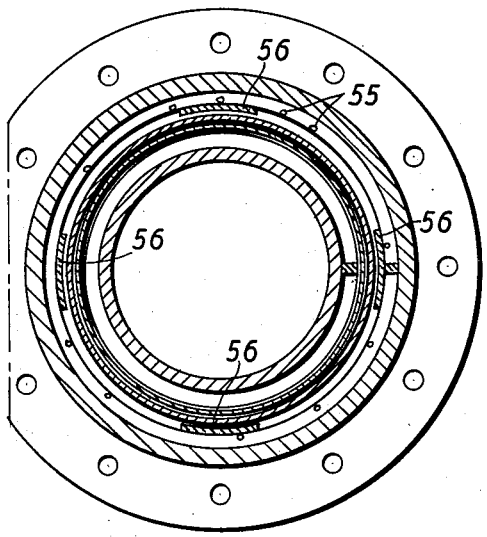
Fig. 5 is a similar view on the line 5—5 of Fig. 1.
Figure 6:
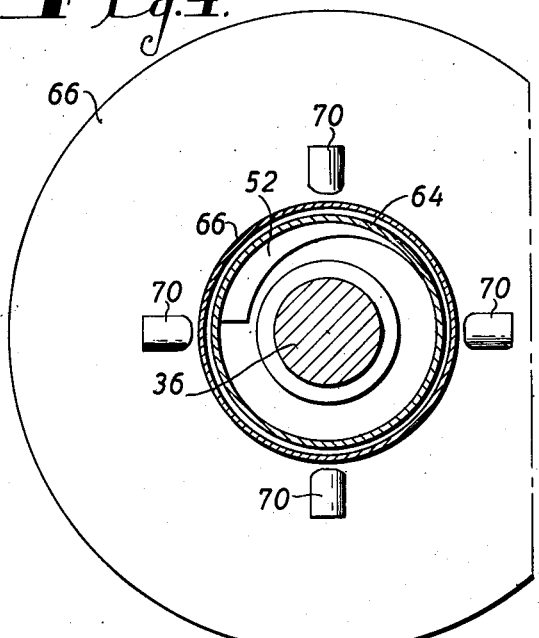
Fig. 6 is a sectional view on the line 6—6 of Fig. 1 of the cones between which a channel is formed for feeding the medium to the apparatus and the trunnion at the tapered end of the drum.
Figure 7:
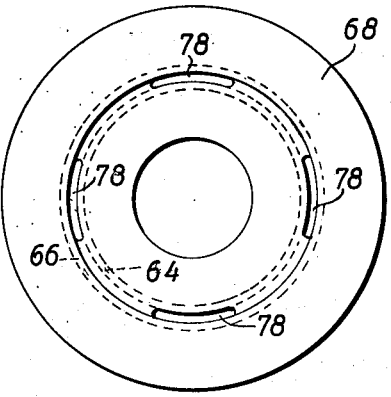
Fig. 7 is a face view of the plate to which the cones shown in Fig. 6 are connected.
Figure 8:
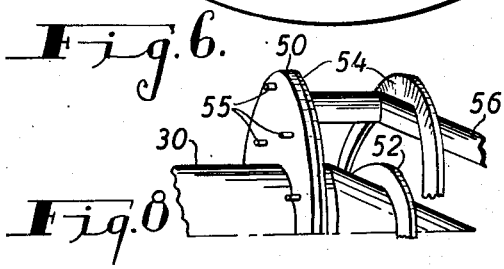
Fig. 8 is a detail perspective view showing a portion of the joint between the cylindrical and conical screw members.

The worm comprises a portion 50 welded to the cylindrical portion of the drum 30 and extending from the drum to the wall of the shell 14 as well as a portion 52 of less depth welded to the conical portion of the drum 30, and a removable portion 54 of the worm is carried by four ribs 56 which are connected to the last convolute of the portion 50 by means of pins 55, see Figs. 5 and 8.

Figure 3:
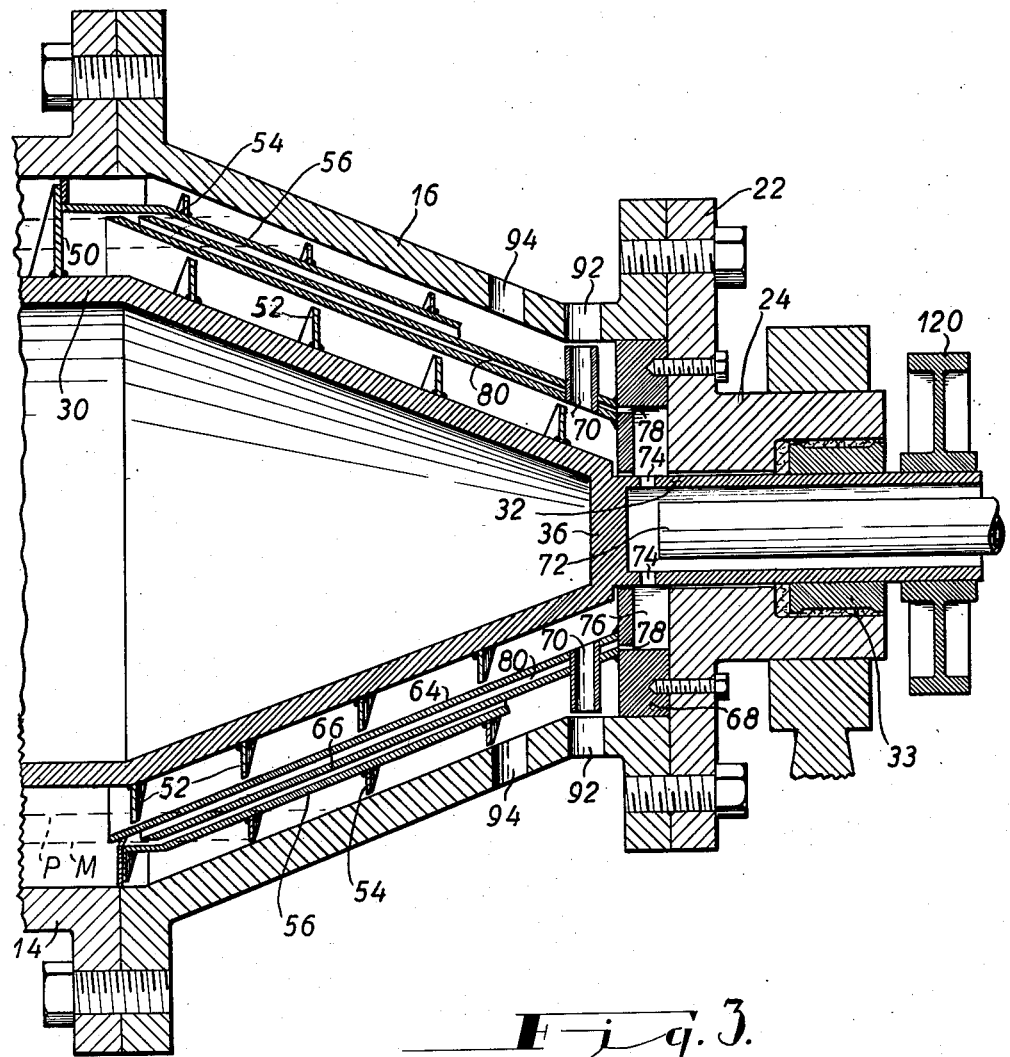
Fig. 3 is a section similar to Fig. 2 of the right hand end.
Figure 4:
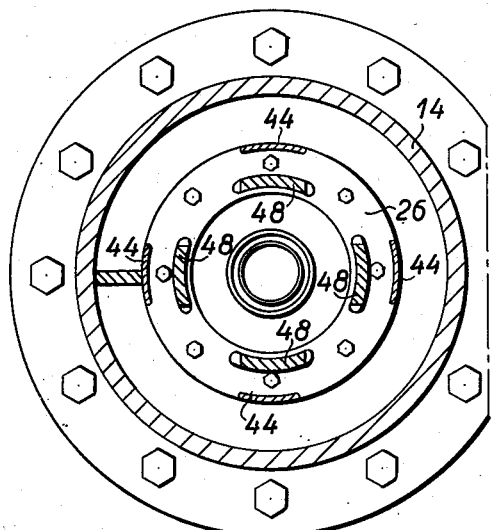
Fig. 4 is a sectional view on the line 4—4 of Fig. 1.

Located between the portions 52 and 54 of the worm are spaced conical members 64 and 66 connected at their smaller ends to a disc 68 by welding as shown in Fig. 3 which disc is secured to end plate 22 on the end of the conical shell 16 and is arranged to rotate therewith.

Outlet tubes 70 for the lighter solids are welded to the inner conical member 64 and extend through the outer conical member 66 and are welded thereto to prevent leakage of the medium from an annular channel 80 between the conical members 64 and 66.

The medium is fed to the apparatus through tube 72 which extends into the inner end of hollow trunnion 32 to a point close to the closed end 36. The medium flows from the hollow trunnion 32 to a chamber 76 in disc 68 through ports 74 and flows from chamber 76 through a plurality of arcuate ports 78 into conical channel 80 between conical members 64 and 66, and is delivered to the space between the drum 30 and the shell 14 at the point of the separation and removal of the light and heavy solids.

Extending through the hollow trunnion 20 at the other end of the apparatus is a feed pipe 82 having a screw therein for feeding dry solid material into the cup-shaped member 26.

Extending through end plate 18 is a plurality of tubes 86 through which the medium flows from the shell 14, each tube provided with a valved outlet 88 and an inwardly directed freely open outlet portion 90 for maintaining the level of the medium at the level M; a plurality of water outlet tubes 100 also extend through the end plate 18 for maintaining the water at the level P when water is fed with the solids as hereinafter described.

A casing 102 surrounds the separating apparatus and is divided by its end walls and partitions forming chambers 104, 106, 108 and 110, provided with outlets 112, 114, 116 and 118, respectively, leading from the chambers.

The outlet tubes 70 for the lighter solids are in the plane of outlet openings 92 through the wall of shell 16, and 94 are outlets through the wall of shell 16 for the heavier solids.

The outlets 100 for the water open into chamber 104, outlets 88 and 90 for the medium open into chamber 106, outlets 94 for the heavier solids open into chamber 108, while the outlets 92 for the denser material open into chamber 110. Connected to trunnion 32 is a pulley 120 and connected to trunnion 20 is a pulley 122 somewhat larger in diameter than pulley 120 so that when the apparatus is driven from a common shaft having pulleys of the same diameter (not shown) the drum with the worm thereon will be driven slightly faster than the shells to feed the solids being separated to their respective outlets.

Assuming that dry solids are to be separated, the apparatus is rotated at its proper speed, medium is fed to the apparatus at a predetermined rate, the valved outlets 88 being partially closed while continuously discharging medium through outlets 90 to maintain the level of the medium at the level M. After the level of the medium has been established as above described, dry solids are fed by screw 84 through pipe 82 into the cup-shaped member 26, the material is thrown outwardly by centrifugal force through openings between ribs 48 in the annular wall of the cup-shaped member towards the wall of the main shell 14 between the ribs 44 and the convolutes of the portions 50 of the worm, the solids are slowly moved towards the conical shell 16 between the wall of shell 14 and drum 30 by the worm. During the movement of the solids towards the conical shell, the lighter solids will float on the medium while the solids heavier than the medium will be maintained therein. When the solids reach the end of the portion 50 of the worm at the point of delivery of the medium from the annular channel 80 at the zone where the surface density of the medium is at its maximum, the portion 52 of the worm will skim the lighter solids from the surface of the medium and convey them along the inner face of conical member 66 to outlet tubes 70, through which the solids will pass and be delivered through outlets 92 to chamber 110 to be carried off through outlet 118.

The heavier solids within the medium will be conveyed along the inner face of shell 16 to outlets 94 and will be delivered to chamber 108, from which it is withdrawn through outlet 116. The medium which is thrown out through outlets 90 to chamber 106 is withdrawn through outlet 114 and is regenerated and returned to the supply to be delivered to the apparatus.

When dry solids are being separated, ports 100 are closed so that fine solids cannot escape into chamber 104.

When wet pulp is to be separated, the pipe 82, together with the feed screw therein, is removed from the hollow trunnion 20, and a feed pipe 120 for feeding solids and water is inserted through the hollow trunnion 20, as well as the hollow stub shaft 28 into the chamber 42 in the end of drum 30, which is delivered to the space between the inner face of shell 14 and the outer face of the drum 30 between the flights of the portion 50 of the worm, through ports 98 some distance from the end plate 18, through which the water outlet tubes 100 extend, so that any solids carried by the water will settle out before the outlets 100 are reached and will be conveyed counter to the flow of the water by the worm, thus, the water overflow will be substantially clear.

Figure 2:
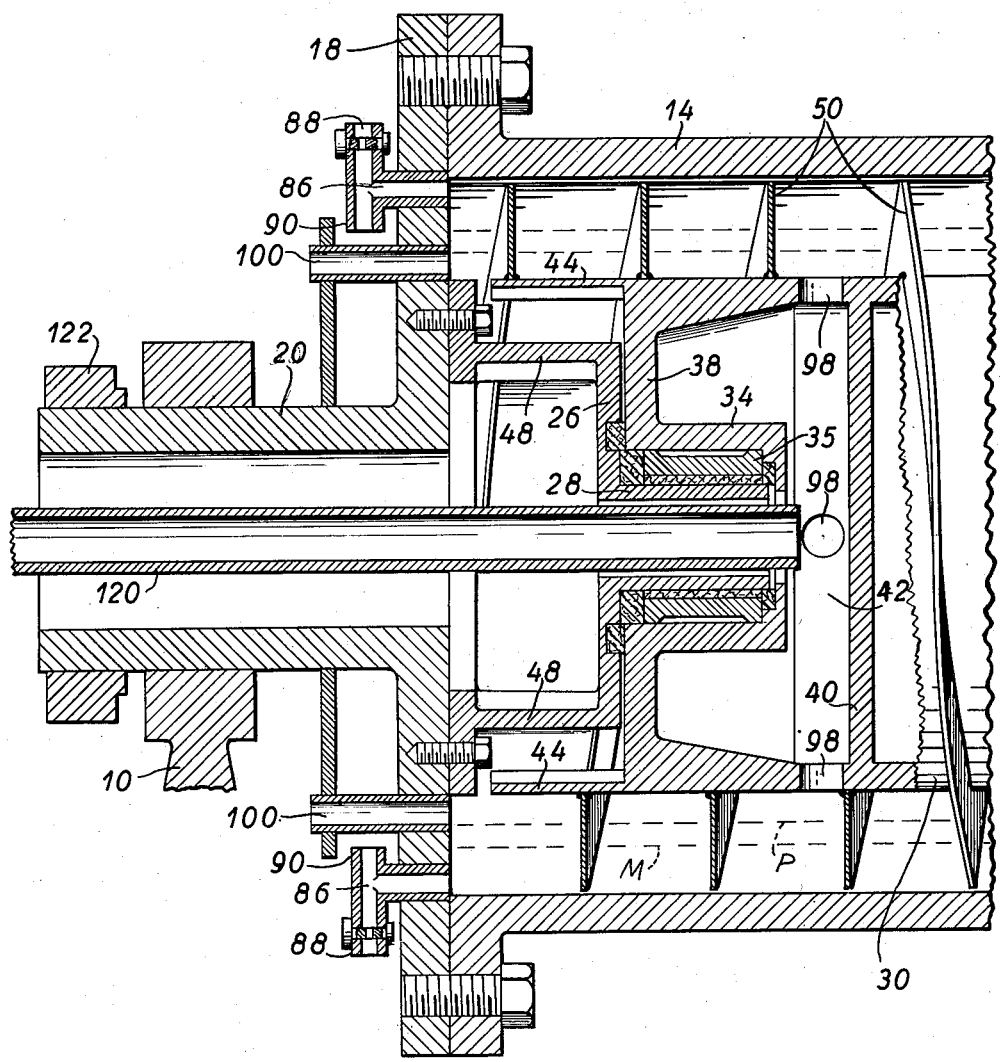
Fig. 2 is a section of a portion of the left hand end of the apparatus on a larger scale showing the feed pipe in position to feed wet pulp and water.

The separating of wet solids or pulp is carried out in the same manner as when separating dry solids by first rotating the empty apparatus and after the speed of the apparatus for separating solids has been reached the apparatus is charged with medium, from pipe 72, water and solids are then delivered to chamber 42 through pipe 120, see Fig. 2. The separation is then carried out as above described with the addition of the continuous discharge of water through outlet tubes 100 for the water.

One of the advantages of my invention results from the provision of a separating apparatus whereby solids may be fed in dry form to the apparatus with the use only of a separating medium, or, may be fed to the apparatus together with water.

Another advantage results from the provision of a separating apparatus in which the only changes required for changing from dry feeding to wet feeding (with water) is the withdrawal from the separator of the pipe together with the screw therein for feeding dry solids and the insertion into the separator of the pipe for feeding solids with water.

Another advantage results from the provision of means for delivering the medium to the medium pool just below the surface thereof at the zone where the separation between light and heavy solids takes place, so that density of the medium is at its maximum at said zone.

Another advantage results from the provision of means for positively conveying the separated light and heavy solids in one direction while the flow of the medium and water are carried counter thereto.

What I claim and desire to protect by Letters Patent is:

1. A centrifugal separator for separating solids comprising a shell, means for rotating the shell, a drum rotatably mounted within the shell, means for rotating the drum in the same direction as the shell and at a different speed from the speed of rotation of the shell, an inlet for continuously delivering separating medium between the shell and the drum, an inlet for continuously delivering water and solids between the shell and the drum, an outlet maintaining a constant level of medium between the shell and the drum, an outlet maintaining a constant level of water between the shell and the drum, the solids being separated into light and heavy annular layers by centrifugal force and the medium, a worm carried by the drum within the shell for conveying the separated solids within the shell, the worm having two concentrically arranged conical portions extending from its trailing end to which the solids are conveyed by the worm, the conical portions converging toward their outer ends, a conical separating member extending between the two conical portions of the worm, the water and medium outlets being positioned to maintain the levels of the water and the medium such as to provide concentric annuli of water and medium with the boundary therebetween lying substantially adjacent to the maximum diameter end of the separating conical member, an outlet for light solids in communication with the trailing end of the worm on the interior of the conical separating member, an outlet for heavy solids in communication with the trailing end of the worm on the exterior of the conical separating member, said conical member acting to separate the heavy solids within the medium from the light solids floating on the medium, thereafter the separated solids being conveyed to said outlets by said conical portions of the worm on either side of said conical member.

2. A centrifugal separator for separating solids comprising a shell, means for rotating the shell, a drum rotatably mounted within the shell, means for rotating the drum in the same direction as the shell and at a different speed from the speed of rotation of the shell, an inlet for continuously delivering separating medium between the shell and the drum, an inlet for continuously delivering water and solids between the shell and the drum, an outlet maintaining a constant level of medium between the shell and the drum, an outlet maintaining a constant level of water between the shell and the drum, the solids being separated into light and heavy annular layers by centrifugal force and the medium, a worm carried by the drum within the shell for conveying the separated solids within the shell, the worm having two concentrically arranged conical portions extending from its trailing end to which the solids are conveyed by the worm, spaced conical separating members extending between the two conical portions of the worm, the water and medium outlets being positioned to maintain the levels of the water and the medium such as to provide concentric annuli of water and medium with the boundary therebetween lying substantially adjacent to the maximum diameter ends of the spaced conical separating members, an outlet for light solids in communication with the trailing end of the worm on the interior of the inner of the spaced conical separating members, an outlet for heavy solids in communication with the trailing end of the worm on the exterior of the outer of the spaced conical separating members, said conical members acting to separate the heavy solids from the light solids and thereafter the separated solids being conveyed to said outlets by said conical portions o the worm, the space between the conical members forming a portion of the inlet through which the medium is delivered between the shell and the drum.

3. A centrifugal separator for separating solids comprising a shell, means for rotating the shell, a drum rotatably mounted within the shell, means for rotating the drum in the same direction as the shell and at a different speed from the speed of rotation of the shell, an inlet tube extending into one end of the separator for continuously delivering separating medium between the shell and the drum, an inlet at the other end of the separator for continuously delivering water and solids between the shell and the drum, an outlet for maintaining a constant level of medium between the shell and the drum, an outlet for maintaining a constant level of water between the shell and the drum and through which tails carried by the water are discharged, the solids being separated into light and heavy annular layers by centrifugal force and the medium, a worm carried by the drum within the shell for conveying the separated solids within the shell, the worm having two concentrically arranged conical portions extending from its trailing end to which the solids are conveyed by the worm, the conical portions converging toward their outer ends, spaced conical separating members carried by the shell extending between the two conical portions of the worm, the water and medium outlets being positioned to maintain the levels of the water and the medium such as to provide concentric annuli of water and medium with the boundary therebetween lying substantially adjacent to the maximum diameter ends of the spaced conical separating members, an outlet for light solids in communication with the trailing end of the worm on the interior of the inner of the spaced conical separating members, an outlet for heavy solids in communication with the trailing end of the worm on the exterior of the outer of the spaced conical separating members, said conical members acting to separate the heavy solids within the medium from the light solids floating on the medium and thereafter the separated solids being conveyed to said outlets by said conical portions of the worm.

4. A centrifugal separator for separating solids, comprising a shell, means for rotating the shell, a drum rotatably mounted within the shell, means for rotating said drum in the same direction as the shell and at a different speed from the speed of rotation of the shell, spaced conical members connected to the end of the shell for continuously delivering a separating medium between the shell and drum through the space between the conical members, an outlet for maintaining a constant level of medium between the shell and drum, an inlet for continuously delivering water and solids to the shell, an outlet for maintaining a constant level of water in the shell, said outlets positioned to provide concentric annuli of water and medium, the solids being separated into light and heavy annular layers by centrifugal force and the medium, an outlet for the light solids, an outlet for the heavy solids, a worm carried by the drum within the shell for conveying the separated solids toward their respective outlets, the end of said worm being separated into two conical portions concentrically arranged and reducing in diameter toward their outer ends, a conical member carried by the shell extending between the separated conical portions of the worm for separating the heavy solids within the medium from the light solids floating on the medium before the separated solids are conveyed to the outlets, said conical members at their maximum diameter ends extending substantially to the constant level of the medium and, at their minimum diameter ends, delivering the conveyed separated light and heavy solids to their respective outlets.

5. A centrifugal separator for separating solids of different densities comprising a shell, the shell including a substantially cylindrical portion and a conical portion, the conical portion being of reducing diameter toward the outer end of the shell, means for rotating the shell, a drum rotatably mounted within the shell in spaced relation and substantially concentric therewith, means for rotating the drum in the same direction as the shell and at a speed different from the speed of rotation of the shell, a conical separator extending between the conical portions of the shell and the drum, means for continuously delivering a separating medium to the space between the rotating shell and the rotating drum at a location substantially at the base of the conical portions thereof, the medium forming a rotating annulus therein, an outlet for maintaining a constant annular level of the medium between the substantially cylindrical portions of the shell and the drum, said level being substantially the level of the maximum diameter end of the conical separator, an inlet for continuously delivering solids to be separated to the space between the rotating shell and drum at substantially the cylindrical ends thereof, the solids being separated into light and heavy annular layers by centrifugal force and the medium, a worm conveyor carried by the drum for conveying the separated solids toward the base of the conical portion of the shell and to a location adjacent to the base of the conical separator, a worm conveyor for conveying the light annular layer of solids to a point of discharge within and substantially adjacent to the reduced diameter end of the conical separator and internally of the conical separator, and a worm conveyor for conveying the heavy annular layer of solids to a point of discharge within and substantially adjacent to the reduced diameter end of the shell and externally of the conical separator.

6. A centrifugal separator for separating solids of different densities comprising a shell, the shell including a substantially cylindrical portion and a conical portion, the conical portion being of reducing diameter toward the outer end of the shell, means for rotating the shell, a drum rotatably mounted within the shell in spaced relation and substantially concentric therewith, means for rotating the drum in the same direction as the shell and at a speed different from the speed of rotation of the shell, pair of spaced conical members extending between the conical portions of the shell and the drum, means for continuously delivering a separating medium to the space between the pair of spaced conical members through which it passes to the space between the rotating shell and the rotating drum at a location substantially at the base of the conical portions thereof, the medium forming a rotating annulus within the shell, an outlet for maintaining a constant annular level of the medium between the substantially cylindrical portions of the shell and the drum, said level being substantially the level of the maximum diameter end of the conical separator, an inlet for continuously delivering solids to be separated to the space between the rotating shell and drum at substantially the cylindrical ends thereof, the solids being separated into light and heavy annular layers by centrifugal force and the medium, a worm conveyor carried by the drum for conveying the separated solids toward the base of the conical portion of the shell and to a location adjacent to the base of the conical members, a worm conveyor for conveying the light annular layer of solids to a point of discharge within and substantially adjacent to the reduced diameter end of the conical members and internally of the internal conical member, and a worm conveyor for conveying the heavy annular layer of solids to a point of discharge within and substantially adjacent to the reduced diameter end of the shell and externally of the external conical member.

7. A centrifugal separator for separating solids of different densities comprising a shell, the shell including a substantially cylindrical portion and a conical portion, the conical portion being of reducing diameter toward the outer end of the shell, means for rotating the shell, a drum rotatably mounted within the shell in spaced relation and substantially concentric therewith, means for rotating the drum in the same direction as the shell and at a speed different from the speed of rotation of the shell, a pair of spaced conical members extending between the conical portions of the shell and the drum, means for continuously delivering a separating medium to the space between the pair of spaced conical members through which it passes to the space between the rotating shell and the rotating drum at a location substantially at the base of the conical portions thereof, the medium forming a rotating annulus therein, an outlet for maintaining a constant annular level of the medium between the substantially cylindrical portions of the shell and the drum, said level being substantially the level of the maximum diameter end of the conical separator, an inlet for continuously delivering solids to be separated to the space between the rotating shell and drum at substantially the cylindrical ends thereof, the solids being separated into light and heavy annular layers by centrifugal force and the medium, a worm conveyor carried by the drum for conveying the separated solids toward the base of the conical portion of the shell and to a location adjacent to the base of the conical members, a worm conveyor carried by the drum for conveying the light annular layer of solids to a point of discharge within and substantially adjacent to the reduced diameter end of the conical members and internally of the internal conical member, and a worm conveyor carried by the drum for conveying the heavy annular layer of solids to a point of discharge within and substantially adjacent to the reduced diameter end of the shell and externally of the external conical member.

HOWARD P. RITSCH.

REFERENCES CITED

The following references are of record in the file of this patent:

UNITED STATES PATENTS

| Number | Name | Date |
| --- | --- | --- |
| 750,668 | Liedbeck | Jan. 26, 1904 |
| 832,191 | Holzer | Oct. 2, 1906 |
| 994,497 | Berrigan | June 6, 1911 |
| 1,055,254 | Berrigan | Mar. 4, 1913 |
| 1,064,184 | Wels | June 10, 1913 |
| 1,067,410 | Dupont | July 15, 1913 |
| 1,158,959 | Beach | Nov. 2, 1915 |
| 1,232,104 | Sharples | July 3, 1917 |
| 1,373,219 | Beach | Mar. 29, 1921 |
| 1,699,471 | Laughlin | Jan. 15, 1929 |
| 1,749,057 | Armentrout | Mar. 4, 1930 |
| 2,109,234 | Keenan | Feb. 22, 1938 |

FOREIGN PATENTS

| Number | Country | Date |
| --- | --- | --- |
| 291,930 | Germany | May 16, 1916 |
| 876,531 | France | Aug. 3, 1942 |